(No Model.)

J. W. SCHOAF.
NUT LOCK.

No. 493,122.

Patented Mar. 7, 1893.

Attest:
Elliott P. Hough
F. J. Benjamin

Inventor:
John W. Schoaf,
By Chas J. Gooch
attorney

UNITED STATES PATENT OFFICE.

JOHN W. SCHOAF, OF McKEESPORT, PENNSYLVANIA.

NUT-LOCK.

SPECIFICATION forming part of Letters Patent No. 493,122, dated March 7, 1893.

Application filed December 13, 1892. Serial No. 454,993. (No model.)

*To all whom it may concern:*

Be it known that I, JOHN W. SCHOAF, a citizen of the United States, residing at McKeesport, in the county of Allegheny and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to improvements, as hereinafter set forth in nut locks.

Figure 1:
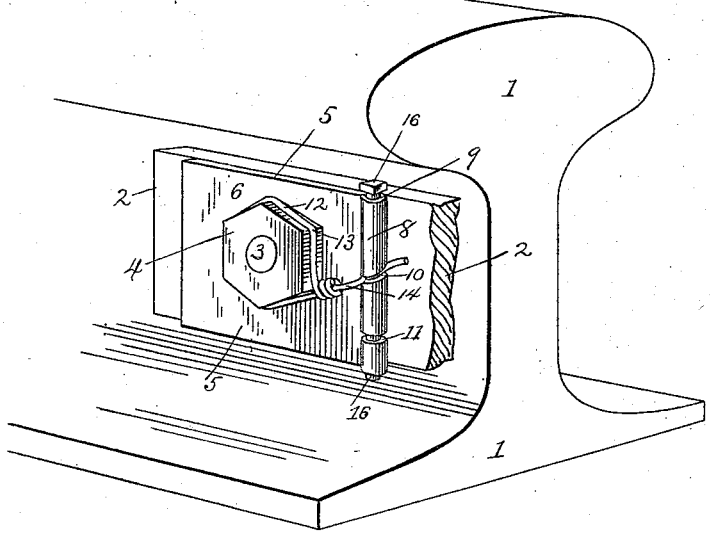
Figure 2:
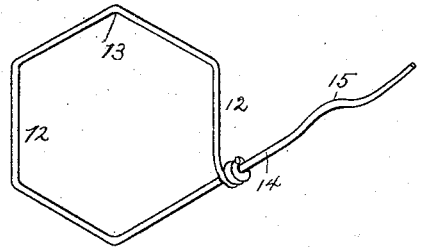
Figure 3:
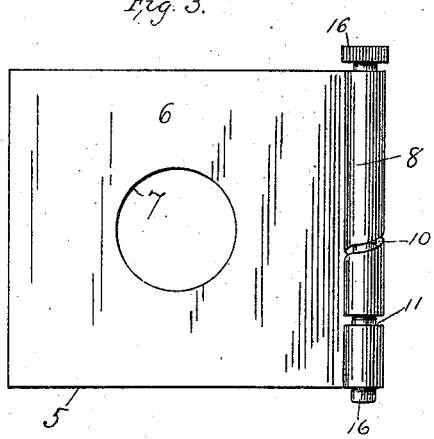

In the accompanying drawings:—Figure 1 represents a perspective view of a portion of a railroad rail and fish-plate with connecting bolt and nut and one of my improved nut locking devices, securing washer and locking bolt or pin in position. Fig. 2 represents a detail view of one of my improved nut grips and locking levers. Fig. 3 represents a detail view of the washer and locking-bolt or pin.

1 represents a portion of a railroad-rail, 2 a fish-plate, 3 a connecting bolt and 4 a nut each of which may be of ordinary construction.

5 represents my novel washer which at its flat portion, 6, is formed with a bolt-receiving orifice 7 and is interposed between the nut and fish-plate. One end of this washer, 5, is either re-curved inwardly to form a vertical tubular socket 8 within which is formed a series of notches or channels of either spiral contour as shown at 10 or of a straight contour as shown at 11.

12 represents the nut-grip or lock which is of angular formation at 13 corresponding with the angular form of the periphery of the nut to be gripped and over and around which said locking device is engaged. Outwardly from this angular portion, 13, extends at a suitable angle an arm, 14 which may either be straight or have one or more curves or bends 15 therein as shown the latter formation of said arm being preferred as thereby firm-gripping surfaces are provided upon and against which the locking-pin or bolt 16 may grip.

While I have, in the drawings, shown my improvement as applied to a railroad rail for the purpose of securing a fish-plate thereto it is manifest that it is equally well adapted for lockingly securing in position nuts in other connections. The bolt 3 having been placed in connecting position the washer, 5, which may be of round, square or any other shape, is passed thereover so as to rest against the article to be secured, whether it be a fish-plate or other article; the nut 4 is then screwed home upon said washer; the nut-locking-lever 12 is then engaged with said nut and is turned thereon to a tighter gripping fit and so as to tighten the nut, and the arm 14 then sprung into the notch or channel 10 or 11 adjacent thereto. The locking-pin or bolt 16 is then inserted within and passed down the tubular socket 8 in the end of the washer, 5, into frictional gripping contact with that portion of the arm, 14 contained within said socket whereby said arm and nut-locking lever are firmly held in position and they, and the nut, prevented from movement or becoming loose.

The nut lock may be of any suitable metal and of any desired thickness and weight. Should the nut at any time require tightening such can readily be accomplished by removing the bolt or pin 16, releasing the arm 14 from engagement with the notch or channel 10 or 11 in which it is contained and grasping said arm and turning it and the portion 13 engaging the nut. Upon such turning and tightening of the nut being thus accomplished, the arm is again sprung into the adjacent notch or channel and gripped in adjusted position by the pin or bolt 16. The notches or channels 10, 11 in the tubular pin or bolt-receiving socket 8 are, in practice, formed sufficiently close together, say about one-quarter of an inch apart, to admit of the turning and tightening of the nut within any necessary degree and the securing of the nut-locking device in its varied positions of adjustment. By forming the arm 14 with curves or bends, 15, gripping faces are provided upon and against which the locking pin 16 will frictionally engage. Where the notches or channels are of spiral form the ready entrance therein of the arm 14 is permitted when it assumes, under the adjustment of the nut-lock and nut, an angular position.

It will be manifest to those skilled in the art that, in lieu of forming the tubular socket in one continuous length, a series of short sockets each having one or more transverse slots therein, may be formed in the washer, and that said slotted socket, or sockets, may be located at any portion of the washer other than the extreme end thereof without departing from my invention.

What I claim as my invention is—

1. A nut-lock consisting of a washer having a tubular socket provided with a plurality of transverse slots or notches, a nut-grip having an angularly-extending arm adapted to engage with either of the notches in said socket, and a pin removably seated within said socket and gripping said arm therein, substantially as and for the purpose set forth.

2. A nut-lock consisting of a washer having its end recurved to constitute a tubular socket, said socket having transversely along its length a series slots, a nut-grip adapted to fit and be turned upon the nut and having an angularly-extending arm provided with one or more curved portions and adapted to engage and rest within the notched portion of said socket, and a pin or bolt removably seated within said socket and adapted to frictionally engage with the curved portions of the arm of the nut-grip seated within said socket, substantially as and for the purpose set forth.

3. A nut-lock consisting of a nut-grip having an outwardly-extending arm and adapted to grip and tighten the nut, a washer having a tubular bolt-receiving socket having transverse open slots or notches adapted to receive the arm of the nut-grip in its adjusted position, and a bolt removably seated within said socket and adapted to grip the arm of the nut-grip therein and permit of the ready adjustment of the position of said arm within said socket, substantially as and for the purpose set forth.

In testimony whereof I affix my signature in presence of two witnesses.

JOHN W. SCHOAF.

Witnesses:
P. W. McCUNE,
FRED ZRUGGEMEYER.